Jan. 17, 1967    H. MEITINGER ET AL    3,298,170
DIAL TRAIN DRIVE

Filed Aug. 24, 1964    5 Sheets-Sheet 1

INVENTORS.
JOSEF EGGER    HEINZ MEITINGER
BY
Davis, Hoxie, Faithfull & Hapgood
ATTORNEYS.

Jan. 17, 1967   H. MEITINGER ETAL   3,298,170
DIAL TRAIN DRIVE

Filed Aug. 24, 1964   5 Sheets-Sheet 3

INVENTORS.
JOSEF EGGER
HEINZ MEITINGER
BY
Davis, Hoxie, Faithfull & Hapgood
ATTORNEYS.

Jan. 17, 1967  H. MEITINGER ETAL  3,298,170
DIAL TRAIN DRIVE
Filed Aug. 24, 1964  5 Sheets-Sheet 4

INVENTORS
Heinz Meitinger
Josef Egger
BY Davis, Hoxie, Faithfull & Hapgood
ATTORNEYS Jan. 17, 1967  H. MEITINGER ET AL  3,298,170
DIAL TRAIN DRIVE
Filed Aug. 24, 1964  5 Sheets-Sheet 5

INVENTORS
Heinz Meitinger
Josef Egger
BY Davis, Hoxie, Faithfull & Hapgood
ATTORNEYS

United States Patent Office 3,298,170
Patented Jan. 17, 1967

3,298,170
DIAL TRAIN DRIVE
Heinz Meitinger and Josef Egger, Pforzheim, Germany, assignors to The United States Time Corporation, Waterbury, Conn., a corporation of Connecticut
Filed Aug. 24, 1964, Ser. No. 401,747
2 Claims. (Cl. 58—28)

This application is a continuation-in-part of the previously filed application for a "Dial Train Drive" having Serial No. 269,966, filed April 2, 1963, now abandoned. The present invention relates to watches and more particularly to a dial train drive.

In certain kinds of watches, especially electrically or electronically driven watches, the dial train is driven by an oscillating lever which is driven by an impulsed and oscillating timing balance wheel. This lever has driving means which rotate an index wheel, so that at each oscillation of the balance wheel the index wheel is stepped up a pre-set step. In many cases, by use of two lever pins as the driving means, the step is equal to half the circular pitch of the index wheel.

To obtain a perfect drive and especially an oscillation of the balance wheel as free as possible, it is necessary that the lever and the index wheel be kept in their final step position. In a known construction the lever and the index wheel are locked in their final step position by a magnet positioned near the lever and a mechanical pawl acting on the index wheel. A recoil of the index wheel by outer influences, such as external shock, is prevented by this lock. In another known construction, one magnet locks the index wheel and another magnet locks the lever.

The objective of this invention, in this type of power take-off, is to simplify the lock means for the index wheel and for the lever, so that the drive is relatively reliable, inexpensive and small.

In accordance with the present invention, a magnet is provided for each step of circular pitch of the index wheel so that a direct or indirect magnetic influence locks the lever as well as the index wheel. The use of a single magnet to perform both functions results in a simpler mechanism and conserves space, which is especially important in wrist watches. Embodiments of the present invention are that the lever as well as the index wheel are directly locked or only the lever or only the index wheel is directly locked. In another embodiment only the lever or the index wheel is locked and a force is exerted by the magnet on the wheel in the case of the lever and the lever in the case of the wheel, whereby the other part will also be locked.

If the step is equal to one circular pitch of the index wheel, only one magnet is necessary. However, the arrangement may be that several steps, especially two steps, constitute one circular pitch and in this case the number of effective magnet poles corresponds to the number of steps.

Other objectives will be apparent from the following description taken in conjunction with the accompanying drawings in which.

Figure 1:
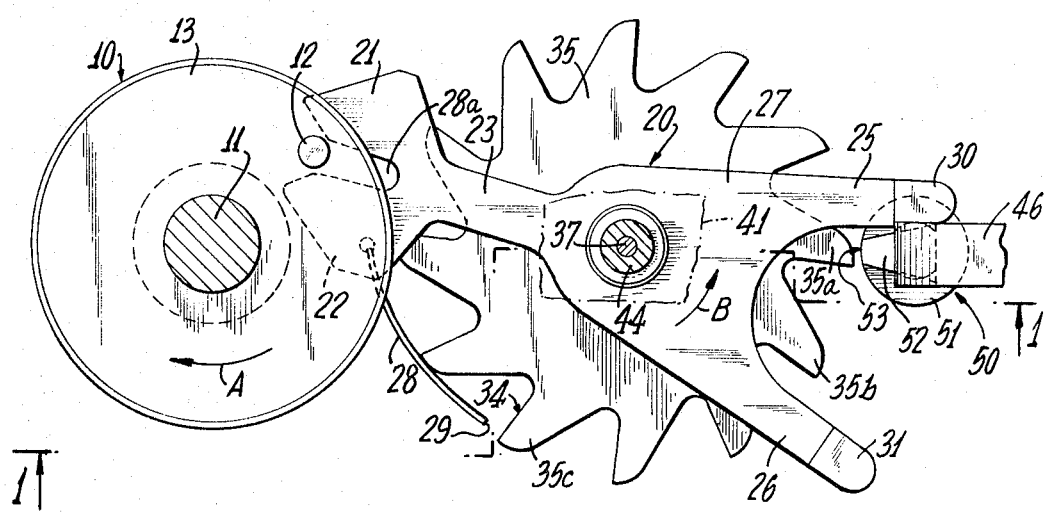
FIG. 1 is a top plan view of a schematic representation of the first embodiment of the invention.

The driving of a dial train by the balance wheel and the transmission of the balance wheel's motion by a lever to an index wheel are known. The representation of these parts is therefore only schematically made in all examples. Furthermore, the proper impulse of the balance wheel, for example electrically or electronically, and the transmission of the motion of the index wheel to the train is also known and since these parts do not belong to the invention, they are omitted in the drawing.

Figure 2:
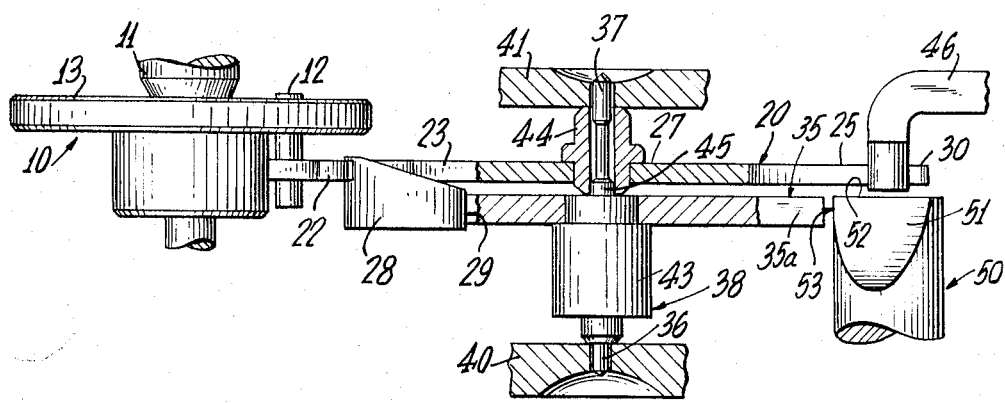
FIG. 2 is a partially cross-sectioned side view taken along lines 1—1 of FIG. 1.

The dial train drive shown in FIGS. 1 and 2 includes driving portion of the balance wheel 10 comprising the balance staff 11 and an impulse disk 13 provided with an impulse jewel 12. The impulsed balance wheel (not shown) and the disk 13 are rigidly fixed on staff 11. The staff 11 is carried in bearings in the frame of the watch (not shown). The disk 13 cooperates with a lever 20 having a horn arm 23 with its horns 21 and 22 and having a fork arm 27 with fork spokes 25 and 26. The horns 21 and 22 form a slot 28a which cooperates with the impulse jewel 12. Magnetic pieces 30 and 31, of magnetizable material, are integral with the ends of spokes 25 and 26, respectively.

An index wheel arbor 38, having integral pivot ends 36 and 37, is carreid in bearings in the plates 40 and 41 (the plates being shown broken away). Arbor 38 is rigidly fixed on a corresponding shoulder of a reinforced center part of the index wheel 35, see FIG. 2. A bearing bushing 44 is provided for the bearing of the lever 20, on whose circumference the lever 20 is rigidly fixed. The bearing bushing 44 is rotationally arranged over a part of the bearing staff end 37 and over a bearing pivot 45 of the index wheel arbor 38. The bearing bushing 44 is axially held between plate 41 and the front face of the index wheel arbor 38. The lever 20 oscillates independently from the index wheel in a plane parallel to the plane of the index wheel.

The oscillation motion of the lever 20 is limited by a limitation finger 46 which is fixed on a stationary part of the watch. In FIG. 2, this limitation finger 46 is arranged above a permanent magnet 50 (partially shown) whose pole 51 cooperates with the teeth of the index wheel and the magnetic pieces 30 and 31. Magnet 50 can be used so that its locking action is caused by its single pole. In order to improve the magnetic flux, both the magnet's poles may be used for locking. Preferably the pole is located in respect to the iron parts of the lever and of the index wheel so that the magnetic resistance is minimum in the lock position. For this purpose at least the teeth of the index wheel are made of magnetizable material, but preferably the whole index wheel is made of such material. The pole 51 of the magnet 50 has a tooth-like shape on its front end 52 so that the small front face 53 is at times opposite to the index wheel tooth.

In operation, the embodiment shown in FIGS. 1 and 2 works as follows:

In the position shown in FIGS. 1 and 2, the front face 53 of the magnet is opposite an index wheel tooth 35a of the index wheel 35 so that the tooth is retained in this position by the magnet. The magnetic piece 30 is attracted by the pole 51 and is pressed against the limitation finger 46. The orientation of the lever 20 is that shown in FIGS. 1 and 2 and the position of the index wheel 35 is determined by the single magnet 50.

When the disk 13 swings in the direction of the arrow A, the lever 20 is taken along in the direction of the arrow B by the horns 21 and 22. The lever swings in direction B until the magnetic piece 31 bits against the limitation against pin 46 and is held in that position by the magnet 50.

An index spring 28, which is fixed on the lever 20, hits against the face 34 of the index wheel tooth 35c with its free end 29 when the lever oscillates in direction of the arrow B. Spring 28 pushes the index wheel 35 an amount corresponding to the swing of the lever. As a consequence, the tooth 35a is rotated out of the effective range of the magnet 50 and the next tooth 35b enters this effective range, so that tooth 35b takes the same position near the pole 51 as the tooth 35a had previously. The return swing of disk 13, opposite in direction to arrow A, restores the lever to the same orientation as in FIGS. 1 and 2 so that the power take-off is ready for the operation to be repeated. As an alternative, impulse jewel 12 can move into the slot 28a and also strike the index wheel directly to step up the teeth in one direction, so that the index spring 28a is unnecessary.

In the arrangement of FIGS. 1 and 2 the step is equal to the circular pitch of the index wheel and a single magnet is necessary. The magnet 50 cooperates with one tooth of the index wheel and subsequently with one of the magnetic parts of the lever. The magnet 50 exerts its locking without any contact with a tooth of the index wheel or the lever, so that sticking is prevented by the air gap between the magnet and parts attracted by it. If desired, a non-magnetic layer may be placed on the concerned parts or on the magnet.

Figure 3:
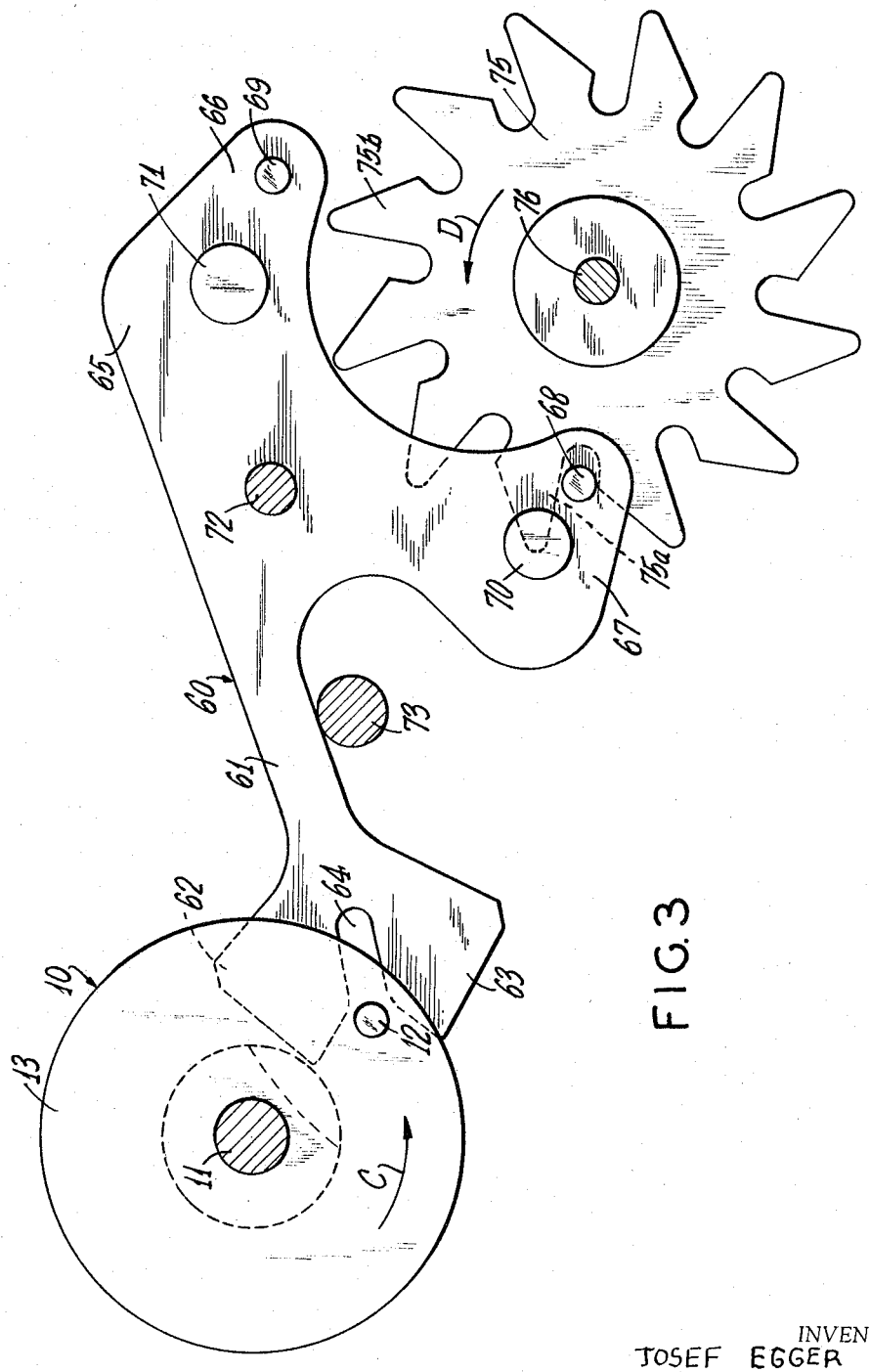
FIG. 3 is a top plan view of a schematic representation of a second embodiment of the present invention.

In the embodiment shown in FIG. 3, the disk is designated with the same reference figures as in FIGS. 1 and 2.

In FIG. 3 the lever 60 has a horn arm 61 with horns 62 and 63 forming between them a slot 64 and a pin arm 65 on which spokes 66 and 67 are arranged. Lever pins 68 and 69 and magnets 70 and 71 are, in the vicinity of the pins, fixed on spokes 66 and 67, respectively. The lever 60 is fixed on the staff 72 which has its bearing in the frames (not shown). The oscillation of the lever in the counter clockwise direction is limited by a banking pin 73 fixed to a frame. The index wheel 75 is fixed on an index wheel arbor 76 which has its bearing in the frames (not shown).

The operation of this embodiment is as follows:

In the position shown in FIG. 3 the lever 60 lies against the banking pin 73 and is retained in this position because the magnet 70 is attracted to the tooth 75a, the attraction of the magnet being toward axis 76. The entire index wheel 75, or preferably its teeth, is made of magnetizable material.

When the disk 13 rotates in the direction of the arrow C the lever 60 is swung clockwise so that its lever pin 69 strikes against the tooth 75b. Wheel 75 is rotated in the direction of the arrow D and is retained in its end position by the magnet 71. The clockwise rotation of lever 60 pulls the lever pin 68 out from the corresponding tooth space and also causing the tooth 75a to be free of the magnet 71.

Contrary to the embodiments of FIGS. 1 and 2 in which the index wheel is shifted for a circular pitch at each second lever oscillation, in this embodiment the index wheel is shifted half a circular pitch at each lever oscillation. However, in this form of construction, a single magnet locks the lever and the index wheel at each step.

The magnets are here arranged on the oscillating lever and cooperate in the lock position with one tooth of the wheel. In the case where the lever steps the index wheel at each step for half a circular pitch, then two magnetic poles on the lever are necessary, the poles being arranged in an appropriate distance from each other. The poles can be the poles of a single magnet or the poles of separate magnets.

In the embodiment shown in FIG. 4, the disk is again designated with the same reference figure as in the preceding forms. The lever 80 has a pin arm 86 having a first spoke 87 and a second spoke 90. The lever pins 88 and 91 are arranged on spokes 87 and 90, respectively.

The lever 80 has also a third spoke 93 which forms together with the second spoke 90 a limiting fork which cooperates with the banking pin 94. The lever is fixed on a lever staff 96 which has its bearing in the frames (not shown).

In a known manner each tooth of an index wheel has a draw face 98. The index wheel is fixed on an index wheel staff 100 which has its bearing in the frames (not shown). Two magnets 102 and 104 cooperate with the index wheel teeth. These magnets can be formed similar to the magnet 50 of FIGS. 1 and 2. The magnets 102 and 104 have poles 105 and 106 and teeth 107 and 108, respectively. Tooth 107 has a front face 110 and tooth 108 has a front face 111, respectively.

Figure 4:
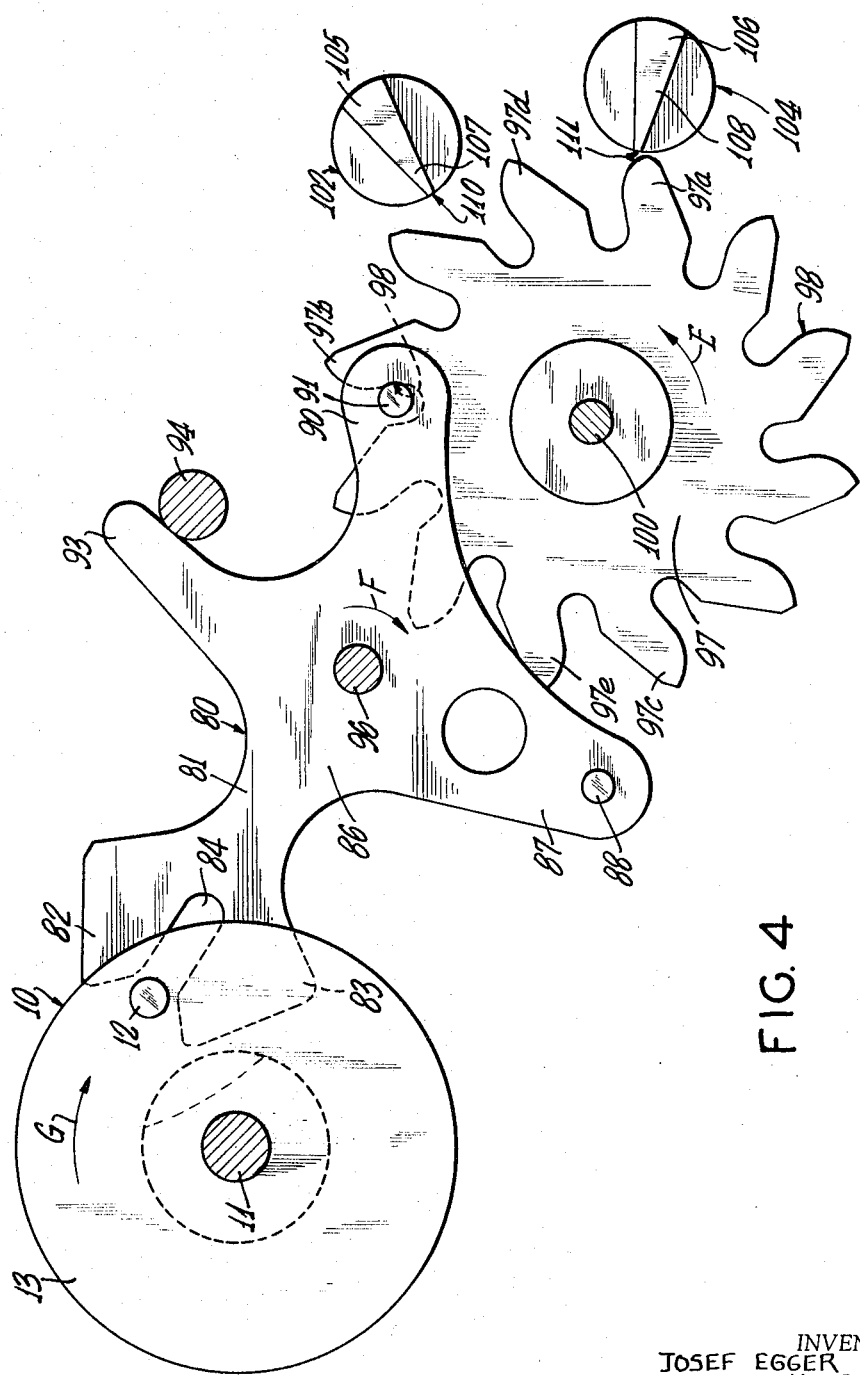
FIG. 4 is a top plan view of a schematic representation of a third embodiment of the present invention.

The operation of the embodiment shown is as follows:

In the position shown in FIG. 4 the tooth 108 of magnet 104 tries to rotate the index wheel forward in the direction of the arrow E until the point of the tooth 97a is directly in front of its front face 111, since in that position the magnetic resistance is at a minimum. Under the influence of attraction forces of the magnet 104, the tooth 97b with its draw face 98 is pressed against the lever pin 91, the magnet trying to swing the entire lever 80 clockwise in the direction of the arrow F. Such a swing is prevented by the spoke 93 being banked against the banking pin 94. Therefore the position of all the parts as shown in FIG. 4 is determined and fixed by the magnet 104.

When the disk 13 oscillates in the direction of the arrow G, the lever 80 is taken along and rotated in the direction opposite to the direction of the arrow F until the spoke 90 hits against the banking pin 94. Thereby the lever pin 91 is pulled away from in front of tooth 97b and the lever pin 88 swings in front of the tooth 97e. The index wheel 97 is rotated in the direction of the arrow E so that the tooth 97a is moved away from the effective range of the magnet 104 and the tooth 97b comes into the effective range of the magnet 102. The locking action of magnet 102 causes the tooth 97d to take the same position relative to the magnet 102, as is the case for the magnet 104 and the tooth 97a shown in FIG. 4. The magnet 104 tries to rotate the index wheel 97 in the direction of the arrow E. The draw face 98 of the tooth 97e presses against the lever pin 88 so that the spoke 90 of the lever 80 is pressed against the banking pin 94 and a new stable position is created by the influence of the single magnet 102.

This action is then continuously repeated. The lock occurs in this embodiment because a stationary magnet which cooperates with the index wheel is provided for each step. The lever is pressed and locked on the banking pin by the draw of an index wheel tooth on a lever pin. The orientation of the lever and the index wheel is such that the stationary magnet, by its attraction on the nearby tooth, tries to move the tooth forward and locks the wheel. The lock position of the lever is also determined by the same lock on the index wheel.

In this embodiment several steps are preferred for each circular pitch. For each step a stationay magnet is necessary and the angular distance of these magnets is chosen to correspond with the steps.

Another embodiment is shown in FIGS. 5, 6, 7 and 8.

Figure 5:
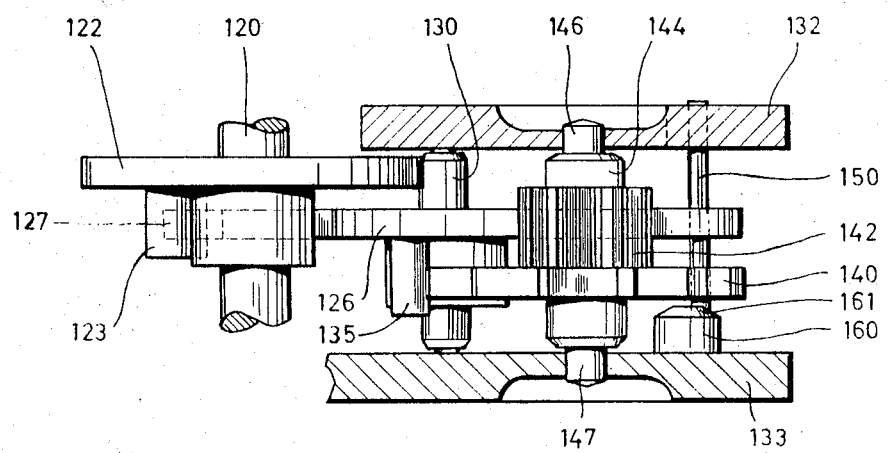
FIG. 5 is a partially cross-sectioned side view of a fourth embodiment of the present invention.

Referring to FIG. 5 the balance staff 120 is retained in conventional bearings. A balance wheel impulse disk 122 has mounted on it a roller jewel 123 which in turn engages fork 127 of the lever 126. The lever is mounted on lever staff 130 which has its bearings in the upper plate 132 and the lower plate 133.

An indexing jewel 135 is mounted on the lower side of the lever 126 which jewel engages index wheel 144. Index wheel 144 and index wheel pinion 142 are fixed on the index wheel staff 144. The index wheel staff 144 has pivots 146 and 147 which are mounted on frame plates 132 and 133, respectively.

A banking pin 150, made of a magnetizable material such as iron, is mounted on lever 126. The banking pin cooperates with two banking faces 152 and 154 of the upper frame plate 132. A magnet 160 is fixed to the lower frame plate 135 and is formed with a truncated cone shape 161 at its upper end.

Figure 6:
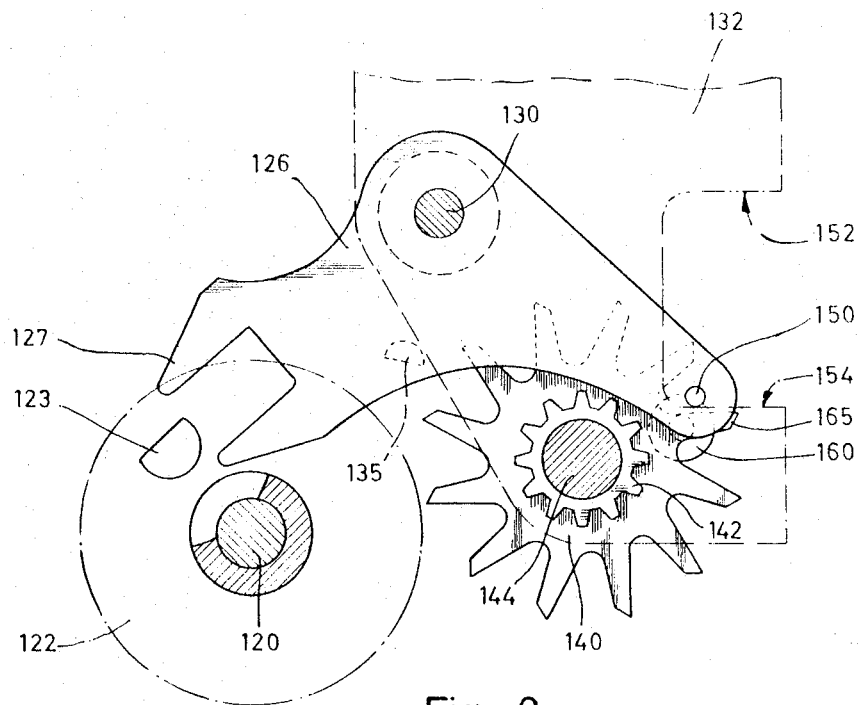
FIG. 6 is a top plan view of the embodiment of FIG. 5 with the lever in its second step position.

Referring to FIGS. 5 and 6 the second step in the operation of this arrangement is shown in detail. A tooth 165 of the index wheel is located above magnet 160 and symmetrically above the truncated cone end 161 in such a manner that tooth 165 is locked in position.

The banking pin 150 by means of magnet 160, is attracted and pressed against the banking face 154 of the upper frame plate 132 so that both the index wheel 140 and the lever 126 are locked. The banking pin 150 engages between two teeth of the index wheel 140 and prevents rotation of the index wheel while the wheel is in its rest position.

Figure 7:
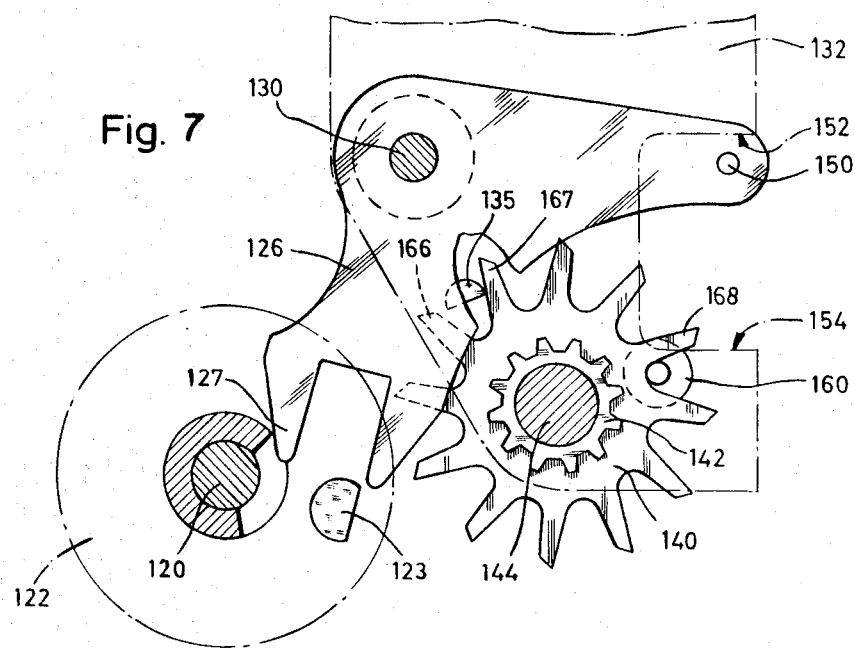
FIG. 7 is a top plan view of the embodiment of FIG. 5 with the lever in an intermediate position between its final positions.

When the balance wheel oscillates again in its reverse direction it engages with its roller jewel 123 in fork 127 and swings the lever 126 in a counterclockwise direction, as shown in FIGS. 6 and 7. The indexing jewel 135 engages between teeth 166 and 167 of the index wheel as shown in FIG. 7 and presses the tooth 167 in essentially a tangential direction. The index wheel 140 will therefore be moved under essentially the full driving force of the lever. FIG. 7 shows the position between both rest positions wherein the banking pin 150 has not yet reached the banking face 152 of the upper frame plate 132. Near the end of the movement of the lever 126 the tooth 168 of the index wheel reaches the area of magnet 160 which now tends to move tooth 168 until the magnetic resistance of the total magnetic circuit formed by the magnetic tooth and the tooth parts is minimum. This will attract tooth 168 into a position as shown by tooth 165 in FIG. 6. However, before this position is reached the banking pin 150 hits banking face 152 of the upper frame plate 132 and stops the movement of the lever. The swinging motion of index wheel 140 continues under the influence of the magnet 160 until the tooth 166 hits the indexing jewel 135. This position is shown in FIG. 8.

Figure 8:
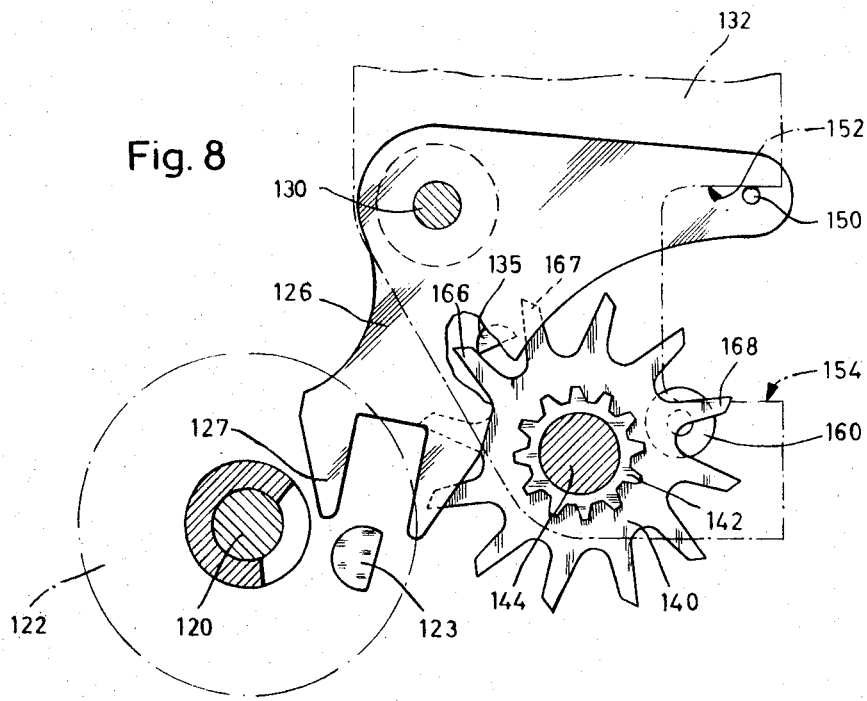
FIG. 8 is a top plan view of the embodiment of FIG. 5 with the parts in the first step position.

As shown in FIG. 8 the parts are arranged in such a manner that tooth 168 cannot reach a symmetrical position relative to magnet 160 and this therefore means that a consistent draw in the circumferential direction on tooth 168 will be exerted by magnet 160. Tooth 166 will continue to be pressed against the indexing jewel 135 and the banking pin 150 will continue to be pressed against banking face 152. Tooth 166 is located essentially tangential to index jewel 135 so that practically the full moment of the magnet on the tooth 168 will be transmitted to the lever 126.

We claim:

1. In a timekeeping instrument having a base plate, a dial train driving mechanism including an oscillatory timing wheel rotatably secured to the plate and having driving means, means to impulse the timing wheel so that it oscillates, a lever rotatably secured in the plate and oscillated between end positions by the timing wheel's driving means, an index wheel having magnetizable teeth rotatably secured to the plate and driven by the lever's driving means, a magnet secured to the lever and positioned adjacent a tooth of the index wheel in an end position of the lever, and fixed means to bank said lever, wherein an end position of the lever said lever is pressed against the banking means and the magnet locks the index wheel.

2. A mechanism as in claim 1 wherein the lever has two driving arms, the lever's driving means comprises two pins each secured in an arm and a magnet is also secured in each arm.

References Cited by the Examiner

UNITED STATES PATENTS

| 3,059,413 | 10/1962 | Detwiler | 58—28 |
| 3,095,690 | 7/1963 | Epperlein | 58—28 |
| 3,122,879 | 3/1964 | Trick et al. | 58—28 |

FOREIGN PATENTS 286,913  3/1953  Switzerland.

RICHARD B. WILKINSON, *Primary Examiner.*

GERALD F. BAKER, *Examiner.*